US012608985B2

(12) United States Patent
Matsutani et al.

(10) Patent No.: US 12,608,985 B2
(45) Date of Patent: Apr. 21, 2026

(54) INFORMATION PROCESSING DEVICE

(71) Applicant: TOYOTA JIDOSHA KABUSHIKI KAISHA, Toyota (JP)

(72) Inventors: Shintaro Matsutani, Kariya (JP); Ryuichi Danno, Kasugai (JP); Atsushi Ikegaya, Aisai (JP); Masashi Nomoto, Tokyo (JP); Oral Kaplan, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 18/631,244

(22) Filed: Apr. 10, 2024

(65) Prior Publication Data

US 2024/0404329 A1 Dec. 5, 2024

(30) Foreign Application Priority Data

Jun. 2, 2023 (JP) ................................. 2023-091851

(51) Int. Cl.
*G07C 5/00* (2006.01)
*G07C 5/02* (2006.01)
*H04W 4/44* (2018.01)

(52) U.S. Cl.
CPC ............... *G07C 5/008* (2013.01); *G07C 5/02* (2013.01)

(58) Field of Classification Search
CPC ........ G07C 5/008; G07C 5/02; G07C 5/0841; H04W 4/44; H04W 4/02; H04W 4/027; H04W 4/38
USPC ........................................................ 701/29.3
See application file for complete search history.

(56) References Cited

U.S. PATENT DOCUMENTS

| | | | | |
|---|---|---|---|---|
| 9,805,601 | B1 * | 10/2017 | Fields | G06F 18/214 |
| 10,380,694 | B1 * | 8/2019 | Grant | G08G 5/32 |
| 2004/0252193 | A1 * | 12/2004 | Higgins | G08G 1/042 348/149 |
| 2007/0027583 | A1 * | 2/2007 | Tamir | H01L 23/49838 701/1 |
| 2013/0302758 | A1 * | 11/2013 | Wright | H04M 1/6041 701/1 |
| 2015/0294422 | A1 * | 10/2015 | Carver | G06Q 40/08 705/4 |

(Continued)

FOREIGN PATENT DOCUMENTS

| | | |
|---|---|---|
| JP | 2014-241098 A | 12/2014 |
| JP | 2019-032725 A | 2/2019 |
| JP | 2022-118371 A | 8/2022 |

*Primary Examiner* — Tyler D Paige
(74) *Attorney, Agent, or Firm* — OLIFF PLC.

(57) ABSTRACT

An information processing device according to an aspect of the present disclosure includes: an information processing device that collects data from a plurality of vehicles, wherein the information processing device acquires a predetermined condition for extracting, from a plurality of vehicles, a vehicle possessing first data, which is data desired by a user who receives the information provision, from the plurality of vehicles; and a control unit that refers to a first database that stores travel data collected from the plurality of vehicles, identifies one or more first vehicles corresponding to travel data satisfying the predetermined condition from the plurality of vehicles; transmits a first data provision request to a terminal associated with the first vehicle; and provides the first data transmitted from the first vehicle to the user.

6 Claims, 4 Drawing Sheets

(56) References Cited

U.S. PATENT DOCUMENTS

| | | | | |
|---|---|---|---|---|
| 2019/0376809 | A1* | 12/2019 | Hanniel | G05D 1/028 |
| 2022/0058701 | A1* | 2/2022 | Fuchs | G07C 5/008 |
| 2024/0161604 | A1* | 5/2024 | Ko | G08G 1/052 |

* cited by examiner

INFORMATION PROCESSING DEVICE

CROSS-REFERENCE TO RELATED APPLICATION

This application claims priority to Japanese Patent Application No. 2023-091851 filed on Jun. 2, 2023, incorporated herein by reference in its entirety.

BACKGROUND

1. Technical Field

The present disclosure relates to technology for collecting data from vehicles.

2. Description of Related Art

Numerous technologies are known for collecting data from vehicles. In relation to this, Japanese Unexamined Patent Application Publication No. 2014-241098 (JP 2014-241098 A), for example, discloses a sensor data management system in which sensor data, representing actions of a user, is collected and anonymized, and the anonymized sensor data and optional sensor data that is collected are combined and transmitted to a data collection business server.

SUMMARY

An object of the present disclosure is to appropriately provide data, collected by a vehicle, to a user that needs the data.

An aspect of an embodiment of the present disclosure is an information processing device for collecting data from a plurality of vehicles, the information processing device including a control unit that executes:

acquiring a predetermined condition for extracting, from the vehicles, a vehicle possessing first data that is data desired by a user that receives provision of information;

identifying, from the vehicles, one or a plurality of first vehicles corresponding to travel data satisfying the predetermined condition, by referencing a first database that stores travel data collected from the vehicles;

transmitting, to a terminal associated with the first vehicle, a request for provision of the first data; and providing, to the user, the first data transmitted from the first vehicle.

Also, other aspects include a method that is executed by the above device, a program for causing a computer to execute the method, and a computer-readable storage medium storing the program in a non-transitory manner.

According to the present disclosure, data that is collected by a vehicle can be appropriately provide to a user that needs the data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
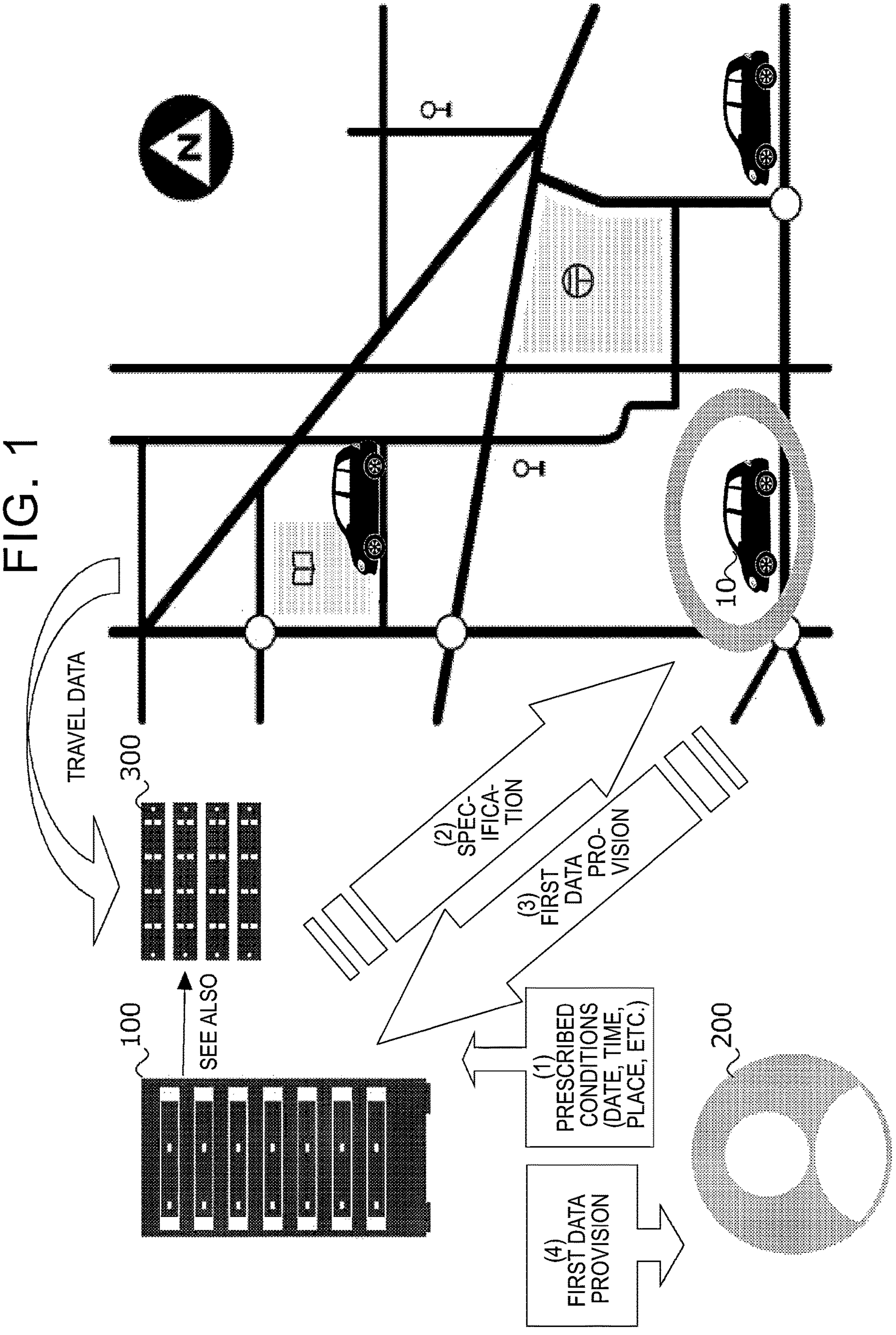
FIG. 1 is a conceptual diagram of processing executed by an information processing device.

There is known a device that performs appropriate processing on various data collected by a sensor mounted on a vehicle and then provides the data to another business operator or the like. By using the data collected from the vehicle, various services can be provided.

In addition, there is a need to identify a vehicle having specific data in response to a request from a business operator or the like (hereinafter referred to as a user) that uses the data.

For example, there is a need for an investigation authority to browse image data captured at a specific location by a drive recorder or the like mounted on a vehicle in order to use the data for investigation or the like.

However, for this purpose, it is necessary to identify a vehicle possessing data desired by the user from among a large number of unspecified vehicles.

Further, even when a vehicle possessing data desired by the user is identified, it is not preferable to collect data without permission of the driver or the owner of the vehicle.

In the present disclosure, the information processing device specifies a vehicle satisfying a predetermined condition for estimating that the user possesses the desired data from among an unspecified number of vehicles, and requests the driver or the owner of the vehicle that has specified the provision of the data to solve this problem.

An information processing device according to an aspect of the present disclosure is an information processing device that collects data from a plurality of vehicles, the information processing device comprising a control unit that executes: acquiring a predetermined condition for extracting, from the plurality of vehicles, a vehicle that possesses first data that is data desired by a user who receives information provision; identifying, from the plurality of vehicles, one or more first vehicles corresponding to travel data that satisfies the predetermined condition with reference to a first database that stores travel data collected from the plurality of vehicles; transmitting, to a terminal associated with the first vehicle, a request to provide the first data; and providing, to the user, the first data transmitted from the first vehicle.

The first data is data that the user desires to browse or use from among data possessed (or possibly possessed) by a plurality of vehicles. The first data includes, for example, an image of a drive recorder acquired at a predetermined date and time and at a specific location, sensor data detected by a sensor mounted on the vehicle, and the like.

The first database is a database installed outside the vehicle and storing traveling data of the vehicle transmitted from a plurality of vehicles. Here, the traveling data is data including position information of the vehicle, speed of the vehicle, and the like. The predetermined condition is a condition for extracting a vehicle possessing the first data.

The control unit specifies a vehicle corresponding to travel data satisfying a predetermined condition among the plurality of vehicles.

Thus, the information processing device according to one aspect of the present disclosure can identify the first vehicle that is a candidate of the vehicle that possesses the first data desired by the user, and transmit the first data provision request to the identified first vehicle. In addition, the first data transmitted in response to the provision request can be provided to the user.

The predetermined condition may include a traveling position or a traveling speed at a predetermined date and time.

Thus, the information processing device according to an aspect of the present disclosure can identify a vehicle that was at a specific location at a specific date and time, or can identify a vehicle that was traveling at a specific speed.

Further, the control unit may acquire second data that is data collected by the first vehicle and analyze the acquired second data to further infer whether or not the first vehicle possesses the first data, and transmit a request for providing the first data to the terminal associated with the first vehicle estimated to have the first data.

Thus, the information processing device according to one aspect of the present disclosure can identify the first vehicle that possesses the first data that is data desired by the user based on the data actually held by the vehicle, and request only the identified first vehicle to provide the first data.

Further, the second data may be an image of a drive recorder included in the first vehicle, and the control unit may estimate whether the first vehicle possesses the first data by analyzing the acquired image of the drive recorder.

Thus, the information processing device according to one aspect of the present disclosure can identify the first vehicle based on the content appearing in the image of the drive recorder.

Further, the control unit may further output a notification for confirming whether the first vehicle possesses the first data to the terminal associated with the first vehicle, and may transmit a request for providing the first data to the terminal associated with the first vehicle that has been confirmed to have held the first data.

Thus, the information processing device according to one aspect of the present disclosure can identify the first vehicle that possesses the first data that is data desired by the user based on the answer from the vehicle, and request only the user of the identified first vehicle to provide the first data.

According to the above configuration, the information processing device can appropriately provide the data collected by the vehicle to the user who needs the data.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

Embodiment

An outline of processing performed by the information processing device according to the embodiment will be described with reference to FIG. 1. FIG. 1 is a conceptual diagram of processing executed by the information processing device 100. In the present embodiment, the information processing device 100 is a server existing outside the first vehicle 10, and performs communication with the first vehicle 10 and the apparatus associated with the user 200.

First, the information processing device 100 acquires a predetermined condition from the user 200. The predetermined condition is a condition for specifying a vehicle (hereinafter, referred to as the first vehicle 10) that possesses data desired by the user 200 from among an unspecified number of vehicles. For example, the predetermined condition is a vehicle that has traveled at a predetermined location at a predetermined date and time, or a vehicle that has traveled at a predetermined location at a predetermined date and time at a predetermined speed or higher. The information processing device 100 uses travel data to identify vehicles that satisfy the above-described conditions. The travel data is position information data or speed data periodically transmitted from the vehicle, and is stored in the first database 300. The information processing device 100 communicates with a device associated with the user 200 and acquires a predetermined condition.

Next, the information processing device 100 identifies one or a plurality of first vehicles 10 that satisfy a predetermined condition from a large number of unspecified vehicles based on the predetermined condition acquired from the user 200. The information processing device 100 refers to the first database 300 that stores travel data of an unspecified number of vehicles, and identifies the first vehicle 10 that is a vehicle satisfying a predetermined condition. As described above, since the predetermined condition is a condition related to the traveling data of the vehicle, the information processing device 100 can identify the first vehicle 10 that satisfies the predetermined condition by referring to the first database 300 that stores the traveling data of an unspecified number of vehicles. Then, the information processing device 100 estimates whether or not the identified first vehicle 10 actually possesses the first data.

Next, the information processing device 100 transmits a first data provision request to the terminal associated with the first vehicle 10 that is estimated to actually possess the first data. For example, the information processing device 100 may display, on the in-vehicle terminal included in the first vehicle 10 or the mobile terminal associated with the first vehicle 10, a screen that can answer whether or not to provide the first data to the user 200. Then, the information processing device 100 may acquire, from a person or an institution associated with the first vehicle 10, an answer to the effect that the first data is permitted to be provided to the user 200. The information processing device 100 acquires the first data from the first vehicle 10 when an answer indicating that the provision of the data is permitted is acquired. Specifically, the information processing device 100 communicates with the first vehicle 10 and receives the first data from the first vehicle 10.

Next, the information processing device 100 provides the acquired first data to the user 200. Specifically, the information processing device 100 enables the user 200 to view the first data stored in the information processing device 100 or the dedicated storage device, or transmits the first data to a device or the like associated with the user 200.

As described above, the information processing device 100 acquires, from the user 200, a predetermined condition for specifying the vehicle that owns the data desired by the user 200, and specifies the first vehicle 10 that satisfies the predetermined condition from the collected travel data of the unspecified number of vehicles. Then, the information processing device 100 transmits a request for providing the first data to the user 200 to the terminal associated with the identified first vehicle 10. Then, when the person or institution associated with the first vehicle 10 agrees to provide the first data to the user 200, the information processing device 100 acquires the first data from the first vehicle 10 and provides the first data to the user 200. Accordingly, the information processing device 100 can appropriately provide the data collected by the vehicle to the user 200 who needs the data.

Figure 2:
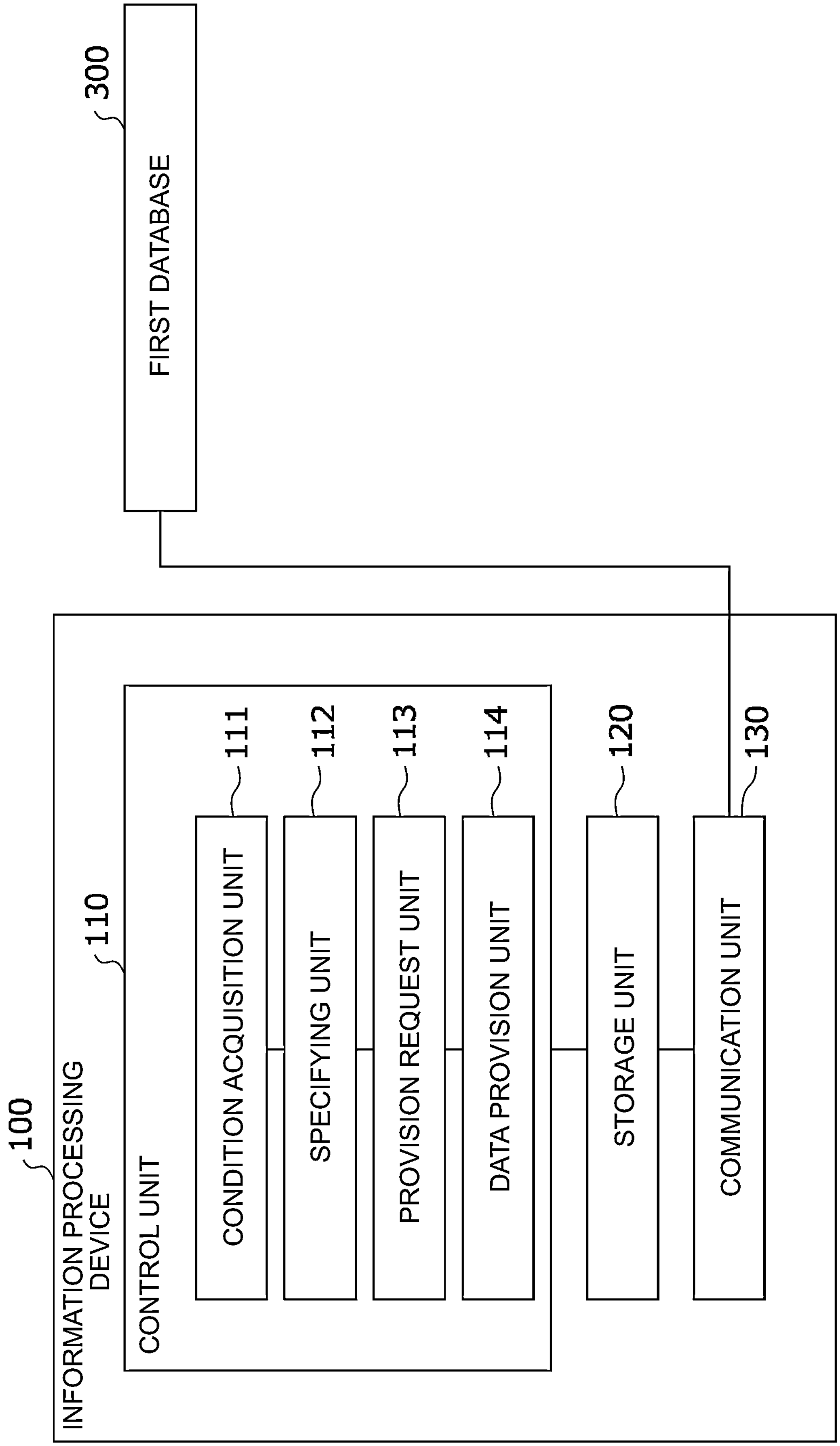
FIG. 2 is a diagram illustrating components included in the information processing device according to the embodiment.

Next, each element constituting the system will be described in detail. FIG. 2 is a diagram illustrating components of a system including the information processing device 100 according to the embodiment.

The information processing device 100 according to the present embodiment includes a control unit 110, a storage unit 120, and a communication unit 130. The information processing device 100 performs wireless communication with the first database 300 and refers to the traveling data. Further, the information processing device 100 performs wireless communication with the apparatus associated with the user 200, and acquires a predetermined condition for specifying the first vehicle 10. Further, the information processing device 100 performs wireless communication with the identified first vehicle 10, requests provision of the first data, and acquires the first data from the first vehicle 10.

The control unit 110 is implemented by a processor such as a Central Processing Unit (CPU) or a Graphics Processing Unit (GPU) and a memory. The control unit 110 includes a condition acquisition unit 111, an specifying unit 112, a provision request unit 113, and a data provision unit 114 as functional modules. These functional modules may be realized by executing a program by the control unit 110.

The condition acquisition unit 111 acquires a predetermined condition for extracting the first vehicle 10 possessing the first data from the unspecified number of vehicles. Here, the first data is data desired by the user 200 who receives information provision from the information processing device 100. The predetermined condition is a condition related to travel data of the vehicle. The condition related to the traveling data of the vehicle is, for example, a traveling speed of the vehicle or a traveling position of the vehicle. The condition acquisition unit 111 performs wireless or wired communication with a device associated with the user 200 via the communication unit 130, and acquires a predetermined condition.

The specifying unit 112 refers to the first database 300 and specifies one or a plurality of vehicles satisfying a predetermined condition as the first vehicle 10. Here, the first database 300 is a database that stores traveling data collected from an unspecified number of vehicles. The specifying unit 112 specifies, as the first vehicle 10, the vehicle corresponding to the traveling data satisfying the predetermined condition from the unspecified number of vehicles.

Further, after the specifying unit 112 specifies the first vehicle 10, the provision request unit 113 estimates whether or not the specified first vehicle 10 possesses the first data.

For example, the provision request unit 113 can acquire the second data from the first vehicle 10 and analyze the second data to estimate whether the first vehicle 10 possesses the first data. In addition, the provision request unit 113 can make an inquiry to the terminal used by the user of the first vehicle 10 to confirm whether or not the first data is held, and can estimate whether or not the first vehicle 10 possesses the first data by acquiring an answer.

The provision request unit 113 transmits a first data provision request to a terminal associated with the first vehicle 10 that is estimated to actually possess the first data. For example, the provision request unit 113 transmits, to the terminal associated with the first vehicle 10, a signal instructing the terminal associated with the first vehicle 10 to display a screen on which it can be answered whether or not to grant the first data to the user 200. Further, the provision request unit 113 acquires, from the terminal associated with the first vehicle 10, an answer as to whether or not to grant the provision of the first data to the user 200. When an answer to the effect that the first data is to be provided to the user 200 is obtained, the provision request unit 113 acquires the first data from the first vehicle 10.

The data provision unit 114 provides the first data to the user 200. Specifically, the data provision unit 114 performs a process of allowing the user 200 to view the first data stored in the storage unit 120 or an external dedicated storage device. Alternatively, the data provision unit 114 transmits the first data to the device associated with the user 200.

The storage unit 120 is an auxiliary storage device such as a main storage device such as a RAM or a ROM, a EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data used or generated in processing performed by the control unit 110, first data, and the like.

The communication unit 130 includes a communication circuit that performs wireless communication. The communication unit 130 may be, for example, a communication circuit that performs wireless communication using 4th Generation (4G) or a communication circuit that performs wireless communication using 5th Generation (5G). The communication unit 130 may be a communication circuit that performs radio communication using Long Term Evolution (LTE) or a communication circuit that performs communication using Low Power Wide Area (LPWA). Further, the communication unit 130 may be a communication circuit that performs radio communication using Wi-Fi (registered trademark).

Next, an apparatus other than the information processing device 100 will be described.

The first database 300 is a database that stores travel data of an unspecified number of vehicles. The first database 300 is implemented by a storage device such as a storage. The first database 300 may be realized by a dedicated device external to the information processing device 100 or may be realized as a database stored in the storage unit 120 of the information processing device 100.

The first vehicle 10 is a passenger car having a function of communicating with the information processing device 100. The first vehicles 10 may include a GPS, a drive recorder, and the like.

The first vehicle 10 periodically generates travel data including the position information of the first vehicle 10 or the speed information of the first vehicle 10, and transmits the generated travel data to the first database 300.

Figure 3:
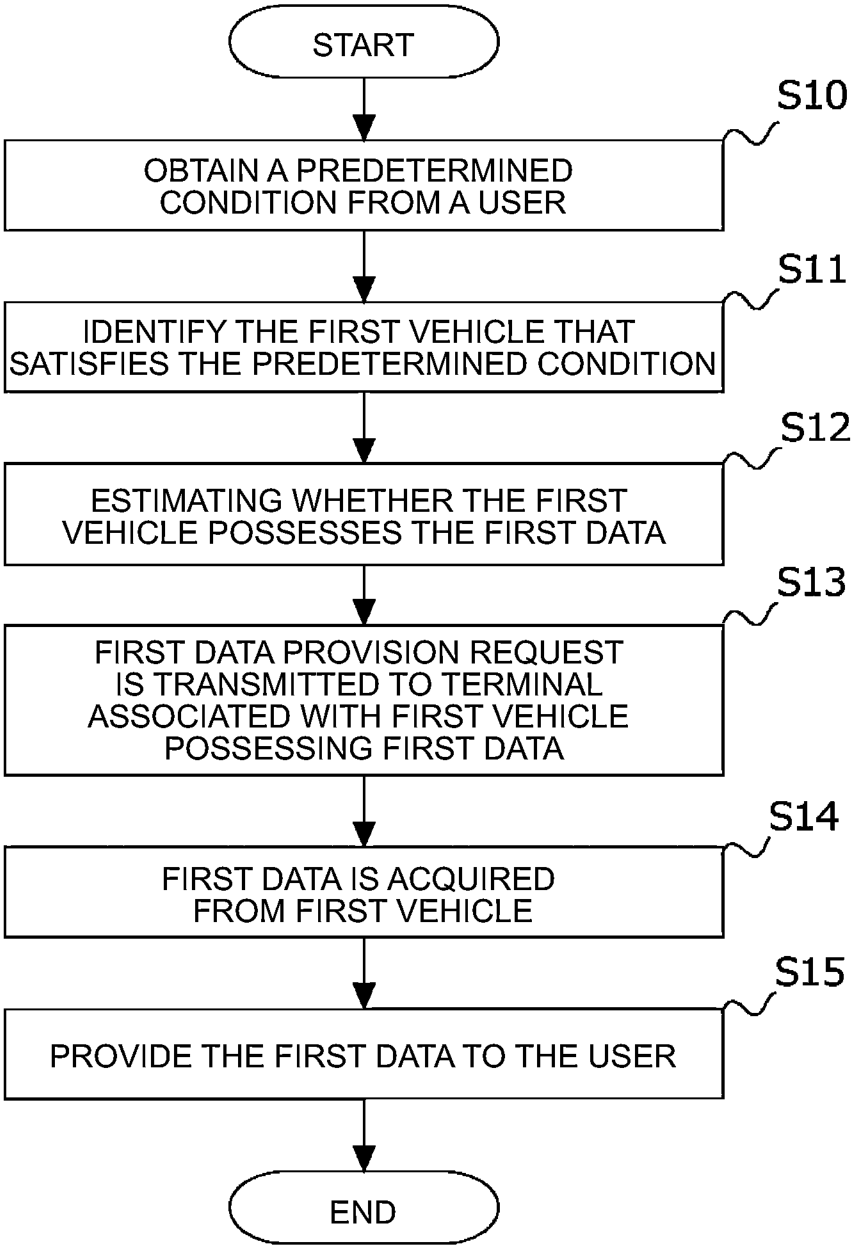
FIG. 3 is a flowchart of processing executed by a control unit of the information processing device according to the embodiment.

Next, specific contents of processing performed by the information processing device 100 will be described. FIG. 3 is a flowchart of processing executed by the control unit 110 of the information processing device 100 according to the embodiment.

Before the processing illustrated in FIG. 3 is executed, it is assumed that the first database 300 collects and accumulates travel data from an unspecified number of vehicles.

First, in S10, the condition acquisition unit 111 acquires a predetermined condition from the user 200. The condition acquisition unit 111 performs wireless or wired communication with a device associated with the user 200 via the communication unit 130, and acquires a predetermined condition that is a condition related to the traveling data and is a condition for specifying the first vehicle 10. Specifically, the condition acquisition unit 111 acquires, as a predetermined condition, a condition such as "a vehicle that was traveling at a predetermined place at a predetermined date and time", and the like.

Next, in S11, the specifying unit 112 specifies the first vehicles 10 that satisfy the predetermined condition acquired by S10. The specifying unit 112 specifies, as the first vehicle 10, one or a plurality of vehicles that satisfy a predetermined condition from among an unspecified number of vehicles.

Specifically, in a case where the date and time and the place where the vehicle was traveling are designated as the predetermined condition, the vehicle traveling at the place at the date and time is identified as the first vehicle 10 from the position information and the time information included in the traveling data.

Next, in S12, the provision request unit 113 estimates whether or not the first vehicles 10 identified by S11 possess the first data. A specific method of estimating whether or not the first vehicle 10 possesses the first data will be described later.

Next, in S13, the provision request unit 113 transmits a provision request for the first data to the terminal associated with the first vehicle 10 that is estimated to possess the first data. For example, the provision request unit 113 transmits the provision request of the first data to the in-vehicle terminal of the first vehicle 10. Alternatively, the provision request unit 113 transmits the provision request of the first data to the mobile terminal associated with the first vehicle 10. The mobile terminal associated with the first vehicle 10 may be, for example, a mobile terminal associated with a person or the like using the first vehicle 10 during a period in which the first data is collected. Further, the first data provision request may be a signal instructing to display, on the in-vehicle terminal of the first vehicle 10, a terminal associated with the first vehicle 10, or the like, a screen on which it is possible to answer whether or not to provide the first data to the user 200.

Next, in S14, the provision request unit 113 acquires the first data from the first vehicle 10. When the provision request unit 113 acquires an answer to grant the provision of the first data to the user 200, it performs wireless communication with the first vehicle 10 and acquires the first data. Here, the first data may be, for example, image data of a drive recorder. The provision request unit 113 records the acquired first data in the storage unit 120 or an external dedicated storage device.

Next, in S15, the data provision unit 114 provides the first data to the user 200. The data provision unit 114 performs a process of allowing the user 200 to view the first data stored in the storage unit 120 or an external dedicated storage device. Alternatively, the data provision unit 114 transmits the first data to the device associated with the user 200.

As described above, the information processing device 100 acquires, from the apparatus associated with the user 200, a predetermined condition that is a condition that is considered to be satisfied by the vehicle possessing the first data that is desired data and that is a condition related to the traveling data. Then, the vehicle corresponding to the traveling data satisfying the predetermined condition is identified as the first vehicle 10 with reference to the first database 300 storing the traveling data of the unspecified number of vehicles. Then, the information processing device 100 estimates whether or not the first vehicle 10 possesses the first data. As a result, the information processing device 100 can identify a vehicle that is estimated to possess the first data desired by the user 200.

Then, the information processing device 100 transmits a first data provision request to the terminal associated with the first vehicle 10. The provided first data is then provided to the user 200. As a result, the information processing device 100 can provide the first data permitted to be provided to the user 200, and thus can appropriately provide the data collected by the vehicle to the user 200.

Next, a specific embodiment of a process performed by the provision request unit 113 to estimate whether the first vehicle 10 identified by S11 possesses the first data (a process performed by S12) will be described. The information processing device 100 estimates whether or not the first vehicle 10 possesses the first data, and transmits a first data provision request to the first vehicle 10 estimated to have the first data.

As an example, the information processing device 100 can estimate whether or not the first vehicle 10 possesses the first data by analyzing the second data included in the first vehicle 10.

Figure 4:
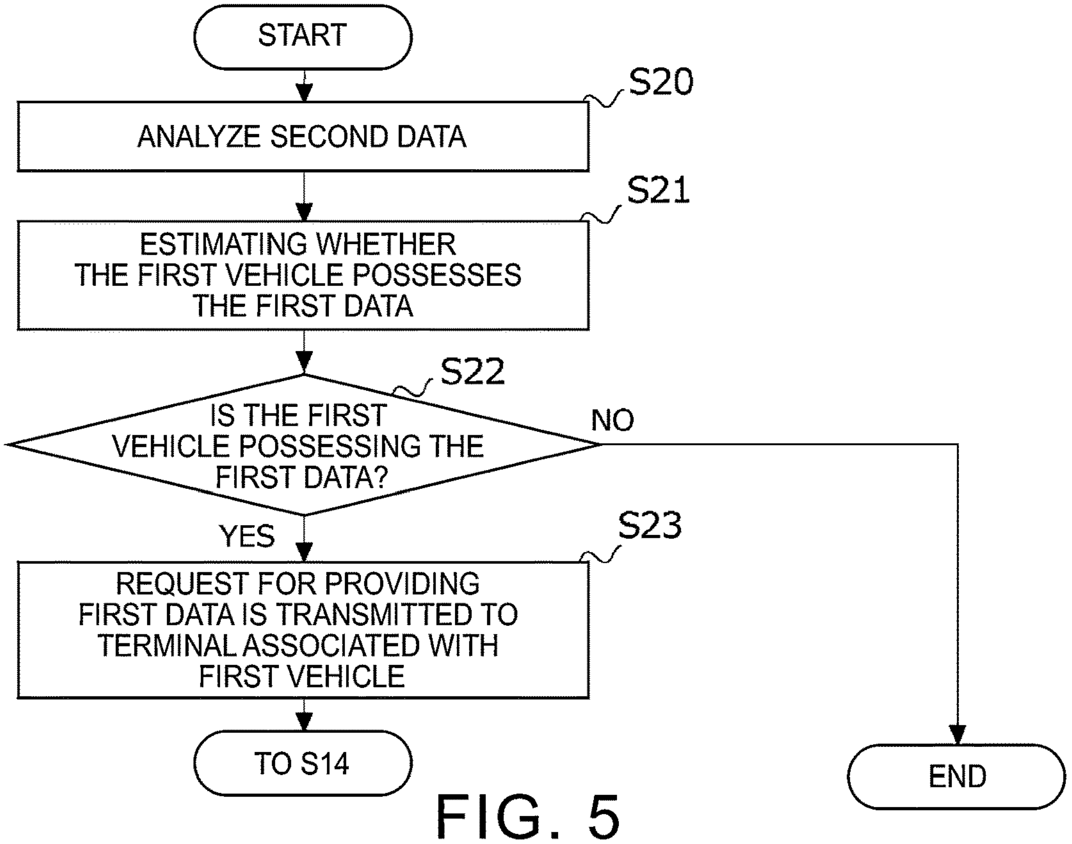
FIG. 4 is a flow chart of a process of estimating that the first vehicle possesses the first data by analyzing the second data by the control unit of the information processing device according to the embodiment.

FIG. 4 is a flowchart of processing performed by the control unit 110 of the information processing device 100 according to the embodiment to estimate that the first vehicle 10 possesses the first data by analyzing the second data. The second data is data collected by the vehicle including the first data, and is, for example, image data of a drive recorder. The process shown in FIG. 4 embodies S12 and S13 shown in FIG. 3. The processing illustrated in FIG. 4 is executed after the processing of S11 illustrated in FIG. 3 is executed.

In S20, the provision request unit 113 analyzes the second data. In this step, the provision request unit 113 analyzes the second data acquired from the first vehicle 10. For example, the second data may be image data of the drive recorder, and the provision request unit 113 may analyze whether or not an object appears in the image data.

Next, in S21, the provision request unit 113 estimates whether or not the first vehicle 10 possesses the first data. The provision request unit 113 analyzes the second data and estimates whether the first data is included in the second data, that is, whether the first vehicle 10 possesses the first data.

Next, in S22, the provision request unit 113 determines whether or not the first vehicle 10 possesses the first data. When the provision request unit 113 determines that the first vehicle 10 possesses the first data, the present step is an affirmative determination.

If an affirmative determination is made in this step, the process transitions to S23.

If a negative determination is made in this step, the process ends. That is, the provision request unit 113 does not transmit the provision request of the first data to the terminal associated with the first vehicle 10.

When the process transitions to S23, the provision request unit 113 transmits a first data provision request to the terminal associated with the first vehicle 10. For example, the provision request unit 113 transmits the provision request of the first data to the in-vehicle terminal of the first vehicle 10. Alternatively, the provision request unit 113 transmits the provision request of the first data to the mobile terminal associated with the first vehicle 10. S23 process is the same as S13 process. After S23 process is completed, S15 process is executed from S14 shown in FIG. 3.

According to the processing of FIG. 4, the information processing device 100 analyzes the data held by the first vehicle 10 to estimate whether or not the first vehicle 10 possesses the first data that is the data desired by the user 200. As a result, it is possible to transmit the first data provision request to only the first vehicle 10 that is estimated to possess the first data.

Figure 5:
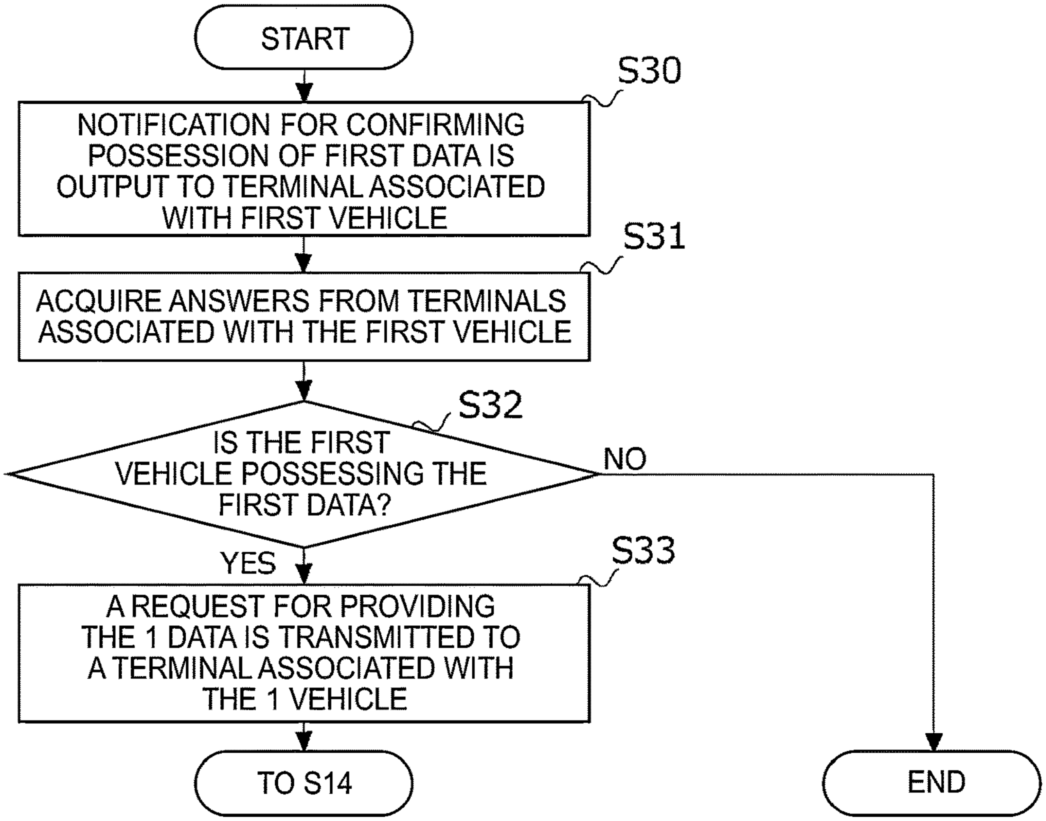
FIG. 5 is a flow chart of a process of estimating that the first vehicle possesses the first data by the control unit of the information processing device according to the embodiments making an inquiry to the user.

Next, another example of the processing described with reference to FIG. 4 will be described. Instead of the processing illustrated in FIG. 4, the information processing device 100 may confirm whether or not the first vehicle 10 possesses the first data with the driver of the first vehicle 10 or the like, and may perform processing of transmitting a first data provision request to the first vehicle 10 that is confirmed to have the first data. FIG. 5 is a flowchart of processing for estimating that the first vehicle 10 possesses the first data by the control unit 110 of the information processing device 100 according to the embodiment making an inquiry to the user 200. The process shown in FIG. 5 embodies S12 and S13 shown in FIG. 3. The processing illustrated in FIG. 5 is executed after the processing of S11 illustrated in FIG. 3 is executed.

In S30, the provision request unit 113 outputs a notification for confirming the possession of the first data to the terminal associated with the first vehicle 10. Specifically, the provision request unit 113 may communicate with a terminal associated with the first vehicle 10, and output an interface that can answer whether or not the driver or the owner of the first vehicle 10 possesses the first data to the display unit of the terminal associated with the first vehicle 10.

Next, in S31, the provision request unit 113 acquires, from the terminal associated with the first vehicle 10, an answer regarding whether or not the first vehicle 10 possesses the first data.

Next, in S32, the provision request unit 113 estimates whether or not the first vehicle 10 possesses the first data. When the provision request unit 113 estimates that the first vehicle 10 possesses the first data, the determination in this step is affirmative.

If an affirmative determination is made in this step, the process transitions to S33.

If a negative determination is made in this step, the process ends. That is, the provision request unit 113 does not transmit the provision request of the first data to the terminal associated with the first vehicle 10.

When the process transitions to S33, the provision request unit 113 transmits a first data provision request to the terminal associated with the first vehicle 10. For example, the provision request unit 113 transmits the provision request of the first data to the in-vehicle terminal of the first vehicle 10. Alternatively, the provision request unit 113 transmits the provision request of the first data to the mobile terminal associated with the first vehicle 10. S33 process is the same as S13 process. After S33 process is completed, S15 process is executed from S14 shown in FIG. 3.

According to the processing of FIG. 5, the information processing device 100 can infer whether or not the first vehicle 10 possesses the first data that is the data desired by the user 200 by checking with the driver or the owner of the first vehicle 10, and can transmit the first data provision request to only the first vehicle 10 that is estimated to have the first data.

Modified Examples

The above-described embodiments are merely examples, and the present disclosure may be appropriately modified and implemented without departing from the scope thereof. For example, the information processing device 100 may be realized not as a server installed outside the first vehicle 10 but as an in-vehicle apparatus mounted in the first vehicle 10.

For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device for collecting data from a plurality of vehicles, the information processing device comprising:

a network interface; and a processor programmed to:

acquire, via the network interface, a predetermined condition for extracting, from the vehicles, a vehicle possessing first data that is data desired by a user that receives provision of information;

query a first database that stores time-stamped vehicle travel data comprising at least vehicle position, speed, and travel trajectory information;

identify, from the vehicles, one or a plurality of first vehicles corresponding to travel data satisfying the predetermined condition, by referencing a first database that stores travel data collected from the vehicles by:

(i) extracting, for each vehicle, a chronological sequence of latitude-longitude coordinate pairs and speed values stored as travel-data entries;

(ii) computing, for each vehicle, a derived travel path by temporally interpolating the coordinate pairs to produce a continuous vehicle trajectory;

(iii) comparing the continuous vehicle trajectory with the predetermined condition to determine whether the trajectory intersects a geographic region, time window, or speed range defined by the predetermined condition; and (iv) selecting, as the first vehicles, the vehicles whose continuous trajectories satisfy the predetermined condition;

transmit, via the network interface using a vehicle-communication protocol, to a terminal associated with the first vehicle, a request for provision of the first data;

cause a display of a mobile terminal associated with the first vehicle to display a screen requesting permission for the provision of the first data;

in response to an input indicating permission for the provision of the first data, receive, via the network interface, the first data; and output, to the user, the received first data through a user-facing terminal.

2. The information processing device according to claim 1, wherein the predetermined condition includes a traveling position, or a traveling speed, at a predetermined date and time.

3. The information processing device according to claim 1, wherein the processor is further programmed to:

acquire second data that is data collected by the first vehicle, further estimate whether the first vehicle possesses the first data, by analyzing the acquired second data, and transmit, to the terminal associated with the first vehicle estimated to possess the first data, a request for provision of the first data.

4. The information processing device according to claim 3, wherein:

the second data is an image of a drive recorder of the first vehicle; and the processor is programmed to estimate whether the first vehicle possesses the first data, by performing image analysis of the image of the drive recorder that is acquired.

5. The information processing device according to claim 1, wherein the processor is further programmed to:

further output, to the terminal associated with the first vehicle, a notification for confirming whether the first vehicle possesses the first data, and transmit, to the terminal associated with the first vehicle that is confirmed to possess the first data, a request for provision of the first data.

6. The information processing device according to claim 1, wherein the mobile terminal associated with the first vehicle is associated with a user of the first vehicle at a time when the first data is collected.

* * * * *